Sept. 17, 1968   H. HESSE   3,401,471
DEVICE FOR TRAINING CLOSED CHEST HEART MASSAGE
Filed July 8, 1965

INVENTOR
Holger Hesse

BY *Spencer & Kaye*
ATTORNEYS

United States Patent Office 3,401,471
Patented Sept. 17, 1968

3,401,471
DEVICE FOR TRAINING CLOSED CHEST
HEART MASSAGE
Holger Hesse, Skovtoftebakken 19,
Copenhagen-Virum, Denmark
Filed July 8, 1965, Ser. No. 470,458
Claims priority, application Great Britain, July 10, 1964,
28,631/64
2 Claims. (Cl. 35—17)

ABSTRACT OF THE DISCLOSURE

A device for teaching persons how properly to perform closed heart massages. An element simulating the body of the human sternum has movably connected to it another element which simulates the xiphoid process of the sternum, and means are provided for indicating when a predetermined excess pressure has been applied to the element simulating the xiphoid process. The indicating means include an elongated frangible member which is capable of breaking with an abrupt snap so that when excess pressure is applied on the xiphoid process, this member will snap and thus give the trainee a naturalistic demonstration of the effect of applying excessive pressure on the wrong place.

---

Figure 1:
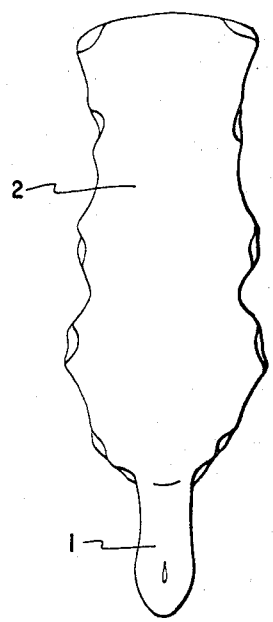

When applying closed chest heart massage one has to depress the sternum, i.e., the chest bone of the patient with a certain rhythm, say, 1 per second, and to a certain depth, say, 3–5 cm. in order to compress the heart and provoke an artificial circulation of the blood. The operator places his hands on the chest bone, as this is the spot where the chest has the greatest power of movement. But it must be avoided to depress the soft parts of the tissue right under the sternum because there is a little bone called the xiphoid process which may break when being depressed, and then may hurt the liver of the patient with more or less fatal results.

When using devices for training such heart massage, such devices have the shape of a human body or of the chest and are also called manikins. It is one purpose of the training therefore to teach the trainee where to place his hands for avoiding hurting the soft tissues or bones. The devices hitherto used therefore have parts simulating the sternum and the soft parts below it, permitting the trainee to palpitate the right spot with the hands, but it is difficult for the supervising teacher to check that the trainee does not touch with his hands the place for the soft tissues and that he does not exercise a too strong and therefore for the patient dangerous pressure on the tissues and especially on the xiphoid process.

It is the aim of this invention to provide a training device which when used, demonstrates to the trainee that there exists in the human chest a bone which might break when exposed to too strong a pressure, and which device indicates to the trainee and to the teacher that the trainee touched the zone of this bone and has depressed this bone too-strongly by mistake.

According to the invention the device is provided with an element simulating the xiphoid process and fixed movably on the chest bone in such a way that this xiphoid element is tilted when exposed to excessive pressure thus indicating to the teacher and the trainee that the trainee had placed his hands on a wrong place or that the pressure on this place was too strong.

For making this indicating more significant, the element simulating the xiphoid process can be provided or connected with an organ, which indicates by a light or sound signal, etc., that the wrong place has been touched or/and that the xiphoid process has been tilted. In order to provide an even more naturalistic demonstration, the device is provided with a frangible element which is capable of breaking with an abrupt snap and which is, in fact, so arranged as to snap upon the application of excessive pressure on the xiphoid process.

The arrangement according to the invention is shown in the drawing.

Figure 2:
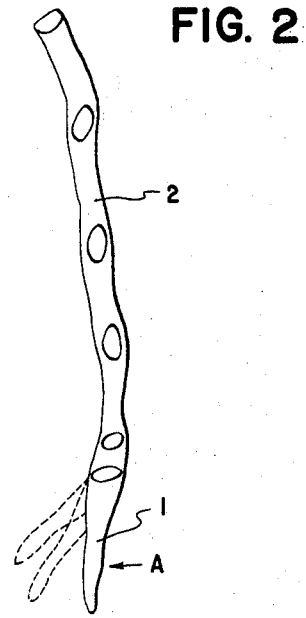
Figure 3:
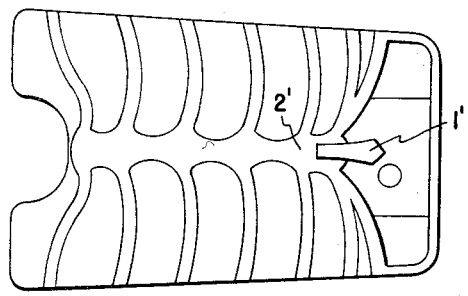
Figure 4:
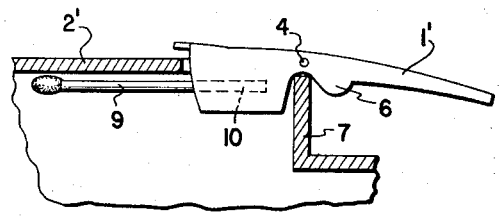
Figure 5:
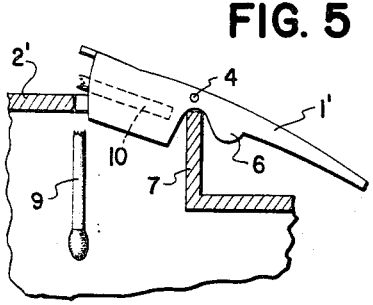
Figure 6:
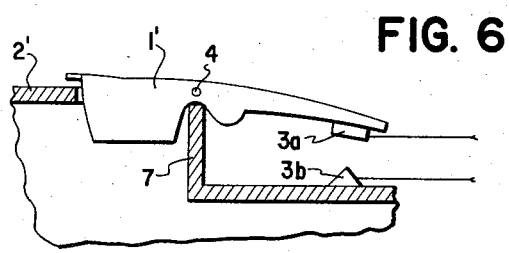

FIGS. 1 and 2 show the chest and the soft bone from the front and from the side. FIGS. 3, 4 and 5 show a manikin for training closed chest heart massage by means of an arrangement according to the invention. FIG. 6 is showing an arrangement provided with electrical contacts for a light or sound signal.

As shown in FIGS. 1 and 2, the xiphoid process 1, being the third piece of the sternum, extends downwardly from the second piece or body 2' of the sternum. The dotted lines in FIG. 2 show how the xiphoid process may be broken by pressure against the bone in the direction of the arrow A.

As shown in FIGS. 3, 4, 5 and 6 the xiphoid element 1', simulating the xiphoid process, is tiltably arranged on a support element 7 which is positioned near the element 2' simulating the body of the chest bone. Thus, when the trainee by a mistake places his hands on the element 1' and applies excessive pressure on this element, this element is tilted out of its position in line with the chest bone element 2', round its pivot axis 4 against the power of friction until a projection 6 on the xiphoid element is stopped on the support 7. Thus, the incorrect massage operation is indicated to the teacher and the trainee.

The xiphoid element could also, for a more naturalistic demonstration of the effect of applying excessive pressure on the wrong place, be made in such a way that a depression could break it at a predetermined spot on which the element is made weak. However, replacing the broken xiphoid element by a new one may be difficult, and therefore, in accordance with this invention, there is provided a xiphoid element which can be tilted and which contains a frangible member which can break easily, i.e., a frangible member which is capable of breaking with an abrupt snap, and which can easily be replaced by a new member. As shown in the drawings, the member, which, as a practical matter, may be constituted by a toothpick or a match such as is shown at 9, is elongated and is carried by one of the two elements 1' and 2' which are pivotable with respect to each other, such as in a hole 10 in the xiphoid process element 1', see FIGURES 3 and 4. The frangible member extends to overlap the other element, this being, in the embodiment shown in FIGURES 3 and 4, the element 2' simulating the sternum. The frangible member is related to the elements 1', 2', in such a manner that it is broken by relative pivotal movement between the elements 1', 2', when the element 1' simulating the xiphoid process is depressed beyond a predetermined limit in response to a predetermined pressure.

As is shown in FIG. 6, electrical contacts 3a, 3b are arranged on the xiphoid element 1' and the support 7 respectively. The contacts are closed when the xiphoid element is pressed down and tilted round its axis 4 and the light or sound signal thus is switched on.

I claim:
1. In a device for teaching persons to properly perform closed heart massages and including structural elements simulating the sternum of a human chest and the soft parts below it, the improvement comprising, in combination: a first structural element simulating the xiphoid process of the human sternum; means pivotally connecting said structural element to a second structural element simulating the body of the sternum; and means for indicating when a predetermined excessive pressure is applied to said first structural element, said last-mentioned means comprising an elongated frangible member capable of breaking with an abrupt snap and carried by one of said structural elements and extending to overlap the other of said structural elements, said member being related to said elements in such a manner that it is broken by relative pivotal movement between said structural elements when said first structural element is depressed beyond a predetermined limit in response to a predetermined pressure.

2. The improvement defined in claim 1 wherein said frangible member is a replaceable member.

References Cited

UNITED STATES PATENTS

| | | | |
|---|---|---|---|
| 437,510 | 9/1890 | Purdy | 35—14 |
| 2,854,011 | 9/1958 | McComb | 131—237 |
| 2,105,592 | 1/1938 | Hathaway, et al. | 35—1 |

EUGENE R. CAPOZIO, *Primary Examiner.*

H. S. SKOGQUIST, *Assistant Examiner.*